(12) United States Patent
Chen et al.

(10) Patent No.: US 10,202,731 B2
(45) Date of Patent: Feb. 12, 2019

(54) METHOD FOR PLANNING AND DESIGNING DEBRIS FLOW DRAINAGE CHANNELS AND APPLICATIONS THEREOF

(71) Applicant: INSTITUTE OF MOUNTAIN HAZARDS AND ENVIRONMENT CHINESE ACADEMY OF SCIENCES, Sichuan (CN)

(72) Inventors: Xiaoqing Chen, Sichuan (CN); Yong You, Sichuan (CN); Peng Cui, Sichuan (CN); Jiangang Chen, Sichuan (CN); Yuhua Zou, Sichuan (CN); Tao Wang, Sichuan (CN)

(73) Assignee: INSTITUTE OF MOUNTAIN HAZARDS AND ENVIIRONMENT CHINESE ACADEMY OF SCIENCES, Sichuan (CN)

( * ) Notice: Subject to any disclaimer, the term of this patent is extended or adjusted under 35 U.S.C. 154(b) by 594 days.

(21) Appl. No.: 14/773,935

(22) PCT Filed: Jul. 16, 2013

(86) PCT No.: PCT/CN2013/079443
§ 371 (c)(1),
(2) Date: Sep. 9, 2015

(87) PCT Pub. No.: WO2014/201742
PCT Pub. Date: Dec. 24, 2014

(65) Prior Publication Data
US 2016/0040381 A1    Feb. 11, 2016

(30) Foreign Application Priority Data

Jun. 20, 2013 (CN) .......................... 2013 1 0244992

(51) Int. Cl.
*E02B 1/02* (2006.01)
*E02B 3/02* (2006.01)
(Continued)

(52) U.S. Cl.
CPC .................. *E02B 1/02* (2013.01); *E02B 3/02* (2013.01); *E02B 5/00* (2013.01); *E02B 3/10* (2013.01); *Y02A 10/383* (2018.01)

(58) Field of Classification Search
CPC . Y02A 10/383; E02B 1/02; E02B 3/02; E02B 5/00; E02B 3/10
(Continued)

(56) References Cited

U.S. PATENT DOCUMENTS 6,196,762 B1 *   3/2001   Stude .................... E03F 5/14
                                                             210/154
9,834,898 B2 * 12/2017   Chen ..................... E02B 33/10

FOREIGN PATENT DOCUMENTS

CN        2734820 Y     10/2005
CN      101476305 A      7/2009
(Continued)

OTHER PUBLICATIONS

Watershed management field manual, Food and Agriculture Organization of the United Nations, Rome 1998, Chapter 4 Drainage Design, pp. 1-47 (Year: 1998).*

(Continued)

*Primary Examiner* — Aniss Chad
*Assistant Examiner* — Justin C Mikowski
(74) *Attorney, Agent, or Firm* — Scully Scott Murphy & Presser

(57) ABSTRACT

A method for planning and designing a debris flow drainage channel is provided. The position and total length of the drainage channel and a longitudinal slope of a gully bed of the drainage channel are determined. An inlet section, an (Continued)

outlet section and an acceleration section of the drainage channel are formed as fully lined channel type. After determining the length of the inlet section and the included angle between the side wall of the inlet section and the main channel, the length of the outlet section and the included angle between the side wall of the outlet section and the main channel, and the length of the acceleration section, the channel type and the length of the main channel section are also determined.

10 Claims, 3 Drawing Sheets

(51) Int. Cl.
  *E02B 5/00* (2006.01)
  *E02B 3/10* (2006.01)
(58) Field of Classification Search
  USPC .................................................. 703/1
  See application file for complete search history.

(56) References Cited

FOREIGN PATENT DOCUMENTS

| CN | 101886374 A | 11/2010 |
| CN | 201695377 U | 1/2011 |
| CN | 102373692 A | 3/2012 |
| RU | 2 188 277 C2 | 8/2002 |
| SU | 1224377 A | 4/1986 |

OTHER PUBLICATIONS

A. J. Aisenbrey, Jr. et. al., Design of Small Canal Structures 1978, US Dept of the Interior, Bureau of Reclamation, pp. 19-38 (Year: 1978).*

Yong You et. al., The Optimal Cross-section Design of the "Trapezoid-V" Shaped Drainage Canal of Viscous Debris Flow, J. Mt. Sci. (2011) 8: 103-107. (Year: 2011).*

* cited by examiner

METHOD FOR PLANNING AND DESIGNING DEBRIS FLOW DRAINAGE CHANNELS AND APPLICATIONS THEREOF

FIELD OF THE INVENTION

The invention relates to debris flow control technology, particularly to a method for planning and designing debris flow drainage channels and applications thereof for both debris flow accumulation fans with a length below 300 meters and debris flow accumulation fans with a length over 300 meters.

BACKGROUND OF THE INVENTION

The density of a debris flow is far higher than the density of a water flow, and the fluidic dualistic structure of the debris flow, which contains clastic soil, has particularity and shows the characteristics of high inertia, strong transport force, and huge impact force. Due to the severe erosion produced by debris flow movement, a gully bed undergoes severe changes that can cause bottom tearing of the gully bed and the collapse of a gully bank, adding solid matter sources that replenish the debris flow, thereby increasing the damage it causes. Drainage channels are among the main engineering measures for the prevention and control of debris flows, and the reasonable planning of debris flow drainage channels has great social, economic and ecological environmental significance for reducing the destructive power of debris flows and improving the safety of downstream protected objects.

Under the influence of factors such as the interaction of mountainous terrain, a debris flow gully and a main river, for example, a debris flow-deposited fan for constructing a drainage channel may be very long, at over 1000 meters, or very short, at only approximately 100 meters. For debris flow-deposited fans with different lengths, the reasonable planning of debris flow drainage channels is key to effectively preventing and controlling debris flows and protecting any protected objects on the deposited fans.

Currently, a debris flow drainage channel generally includes an inlet section, a main channel section and an outlet section in the drainage channel plane. The channel types of the three sections are the same, mainly a fully lined type and a transversely penetrated notched sill type. The integrally single channel type structure easily causes problems that the flow velocity of the debris flow at the upper end of the main channel increases too slowly and the flow velocity of the debris flow at the lower end of the main channel is too fast, so that the upper end of the drainage channel is deposited and the downstream part of the drainage channel is eroded. On the other hand, for a long accumulated fan (length over 300 meters), currently, the same drainage channel is adopted to drain the debris flow generally, which causes defects because it is difficult to adapt the drainage channel to the great changes in the longitudinal slope of a gully bed in a long deposited fan. As a result, the upper end of the drainage channel is eroded and the lower end of the drainage channel is deposited. An overlong drainage channel is not beneficial to the stability of a entire drainage system. For example, after the upper end of a fully lined drainage channel with a length of 750 meters at the Shiwei River in Yunlong County of Yunnan Province was subject to bottom tearing, chain bottom tearing of the drainage channel occurs, and consequently the entire channel was destroyed.

SUMMARY OF THE INVENTION

To address the current problem of lacking reasonable planning and design in the construction of a drainage channel, this invention provides a method for planning and designing debris flow drainage channels. This method is implemented by scientifically planning the composition of a debris flow drainage channel and reasonably selecting the channel type for the main channel. In particular, to construct a drainage channel on a long debris flow accumulation fan with a length of over 300 meters, it is proposed that the flow velocity of a debris flow be regulated by using an inter-channel transitional zone to efficiently drain the debris flow downstream via the drainage channel, thus avoiding the severe erosion and deposition of the debris flow in the drainage channel and thereby maximizing protection of the protected objects on the deposited fans.

For the purpose stated above, the technical scheme of the invention is as follows.

The invention is a method for planning and designing debris flow drainage channels. A drainage channel is divided into a big-end-up bell-mouthed inlet section, an acceleration section, a main channel section in which the debris flow flows in a balanced mode, and a big-end-down bell-mouthed outlet section along the flow direction of the debris flow. The method for planning and designing debris flow drainage channels comprises the following steps:

(1) According to the topographic conditions of the debris flow accumulation fan, plan the position of the drainage channel and determine the total length L of the proposed drainage channel. Following the principle that cutting and filling are basically balanced and according to the topography of the proposed drainage channel, determine the longitudinal slope of the gully bed of the drainage channel, wherein the total length L of the drainage channel is less than or equal to 300 m.

(2) Adopting fully lined channel type in the inlet section. According to the properties of a drained debris flow and the longitudinal slope of the gully bed of the drainage channel determined in step (1), determine the length $L_1$ of the inlet section and the included angle α between the side wall of the inlet section (1) and the main channel, given that the length $L_1$ of the inlet section is generally 1.5-5.0 times as large as the width of the bottom of the drainage channel, and the included angle α between the side wall of the inlet section and the main channel is generally 10-30 degrees. Specific values are determined based on the properties of the debris flow: for a viscous debris flow, $L_1$ takes a maximum value, and a takes a minimum value; for a transitional debris flow, both $L_1$ and a are mid-values; and for a dilute debris flow, $L_1$ takes a minimum value, and a takes a maximum value;

(3) Adopting fully lined channel type in the outlet section. According to the properties of the drained debris flow and the longitudinal slope of the gully bed of the drainage channel determined in step (1), determine the length $L_4$ of the outlet section and the included angle β between the side wall of the outlet section and the main channel, given that the length $L_4$ of the outlet section is generally 1.0-3.0 times as large as the width of the bottom of the drainage channel, and the included angle β between the side wall of the outlet section and the main channel is generally 5-15 degrees. Specific values are taken with reference to the properties of the debris flow: for a viscous debris flow, $L_4$ takes a maximum value, and β takes a minimum value; for a transitional debris flow, both $L_4$ and β are mid-values; and for a dilute debris flow, $L_4$ takes a minimum value, and β takes a maximum value.

(4) Adopting fully lined channel type in the acceleration section. According to steady non-uniform channel gradually varied flow calculation model, determine the $L_2$ of the acceleration section; i.e., the length $L_2$ of the acceleration section=$(E_x-E_s)/(i-J)$, wherein Ex refers to the specific energy of a downstream cross-section of the section, $$E_x = h_2 + \frac{v_2^2}{2g};$$

Es refers to the specific energy of an upstream cross-section of the acceleration section, $$E_s = h_1 + \frac{v_1^2}{2g};$$

i refers to the longitudinal slope of the gully bed of the drainage channel; J refers to the average hydraulic gradient of the top surface of the debris flow at the acceleration section; $h_1$ refers to the sludge-level depth of the debris flow at the upstream cross-section of the acceleration section; $v_1$ refers to the flow velocity of the debris flow at the upstream cross-section of the acceleration section; $h_2$ refers to the sludge-level depth of the debris flow at the downstream cross-section of the acceleration section; and $v_2$ refers to the flow velocity of the debris flow at the downstream cross-section of the acceleration section.

(5) According to the longitudinal slope of the gully bed of the drainage channel determined in step (1) and the optimal longitudinal slope intervals of the gully beds applicable to different channel types of drainage channels, determine the channel type of the main channel section. Determine the length $L_3$ ($L_3=L-L_1-L_2-L_4$) of the main channel section, given that the channel type of the main channel section may be a fully lined type (also known as a V-shaped channel), a symmetrical notched sill type (for a concrete structure, see patent ZL 2010 2 0223262.1), a staggered notched sill type (for a concrete structure, see patent ZL 2009 1 0058217.7), a transversely penetrated notched sill type (also known as a Dongchuan channel), or a box lined type (for a concrete structure, see patent application 201110380681.5). The optimal longitudinal slope intervals of gully beds applicable to different channel types of drainage channels are as follows: 0.01-0.03 for fully lined type, 0.03-0.08 for symmetrical notched sill type, 0.08-0.12 for staggered notched sill type, 0.12-0.20 for transversely penetrated notched sill type and 0.20-0.40 for box lined type.

The main technical concept behind the method for planning and designing debris flow drainage channels is as follows. By regulating the flow velocity of the debris flow from upstream to downstream, severe erosion and deposition of the debris flow during motion is prevented. To increase the flow velocity of the debris flow as far as possible without exceeding the bearing scope of the channel body materials, the drainage channel is divided into an inlet section (in which the debris flow smoothly enters the drainage channel), an acceleration section (in which the flow velocity of the debris flow is rapidly increased), a main channel section (in which the debris flow is drained in a balanced mode at a flow velocity that is as fast as possible without exceeding the bearing scope of the materials) and an outlet section. To enable the debris flow to smoothly enter and exit the drainage channel, the inlet section, the acceleration section and the outlet section are all fully lined channel types. Because the movement characteristics and energy consumption of a debris flow in different types of drainage channels are different, the erosion and deposition characteristics of the debris flow are also different, so that depending on the longitudinal slope of the gully bed, the channel type of the main channel section should be a fully lined type, a symmetrical notched sill type, a staggered notched sill type, a transversely penetrated notched sill type, or a box lined type. The reasonable longitudinal slope ranges of the fully lined type and transversely penetrated notched sill type main channel sections would be determined based on a large set of actual drainage channel engineering statistics, and the reasonable longitudinal slope ranges of the symmetrical notched sill type, staggered notched sill type and box lined type main channel sections would be determined according to the roughness factors of the channel types.

Regulating the flow velocity of a debris flow refers to determining the limited flow velocity of a drainage channel based on the material and structure of the drainage channel. For a cement-rubble structure, the limited flow velocity is 6 m/s; for a concrete structure or a reinforced concrete structure, the limited flow velocity is 8 m/s; and for a steel fiber reinforced concrete structure, the limited flow velocity is 10 m/s. To maximize the drainage efficiency of the drainage channel, the designed flow velocity $v_2$ of the downstream cross-section of the acceleration section and the designed flow velocity of the main channel section are 0.8-1.0 times as large as the limited flow velocity.

This method for planning and designing is suitable for constructing a debris flow drainage channel with a total length L of less than or equal to 300 m. The upstream part of the inlet section of the debris flow drainage channel is provided with a check dam, which is used to regulate the debris flow movement and used with the constructed drainage channel.

When the length of a debris flow-deposited fan is greater than 300 m, from upstream to downstream, at least two debris flow drainage channels that are relatively independent, connected in an end-to-end mode, and constructed according to the method for planning and designing are arranged, and the upstream part of the inlet section of the farthest upstream drainage channel is provided with a check dam used with the drainage channel. A transition zone is arranged between the upstream and downstream drainage channels and is used to accommodate the afflux of a debris flow or a torrential flood in a tributary ditch on the surface of the fan or is used to lead out part of the debris flow to prevent depositing. For a situation in which a drainage channel is constructed on a long deposited fan, according to the longitudinal slope of the gully bed of the long deposited fan, sectional and relatively independent short channels are arranged on the long deposited fan, such that each short channel comprises an inlet section, an acceleration section, a main channel section and an outlet section, and the longitudinal slope of the gully bed of each independent short channel and the channel type of the main channel section are separately determined. A transition zone is arranged at an engaged part between two short channels that can accommodate the afflux of debris flows or floods in other tributary ditches on the surface of the fan. Due to the changes in the longitudinal slope of the gully bed, for a situation in which the drainage capacity of the lower end is reduced, part of the debris flow can be directed out to prevent depositing (connected with a stop and deposit field through an overflow port arranged on the transitional zone) so that local deposits are eliminated, thereby maintaining the safe operation of the drainage channel. The long deposited fan is divided into multiple short channels, and each channel bodies are relatively independent, thereby avoiding a situation in which one short channel bursts and the entire channel is consequently destroyed.

Compared with the prior method, this invention has the beneficial effect that the characteristics of debris flow movement in the drainage channel are fully used and that based on regulating the moving flow velocity of a debris flow, the channel type of the main channel is reasonably selected. To construct a drainage channel on a debris flow-deposited fan with a length of over 300 meters, the long drainage channel is divided into multiple short drainage channels, and a transition zone for regulating the flow velocity of a debris flow is arranged between the sides of the channel to efficiently drain the debris flow downstream, thus preventing the severe erosion and deposition of the debris flow in the drainage channel, providing the maximum guarantee for protected objects on both sides of the drainage channel, and reducing the costs of engineering operating and maintenance.

| | |
|---|---|
| 1 inlet section | 2 acceleration section |
| 3 main channel section | 4 outlet section |
| 5 transition zone | |
| α: included angle between side wall of inlet section and main channel | |
| β: included angle between side wall of outlet section and main channel | |
| L total length | $L_1$ length of inlet section |
| $L_2$ length of acceleration section | $L_3$ length of main channel section |
| $L_4$ length of outlet section | |

DETAILED DESCRIPTION OF THE EMBODIMENTS

The following section further describes the preferential embodiments of the invention with reference to the accompanying drawings.

Embodiment 1

Figure 1:
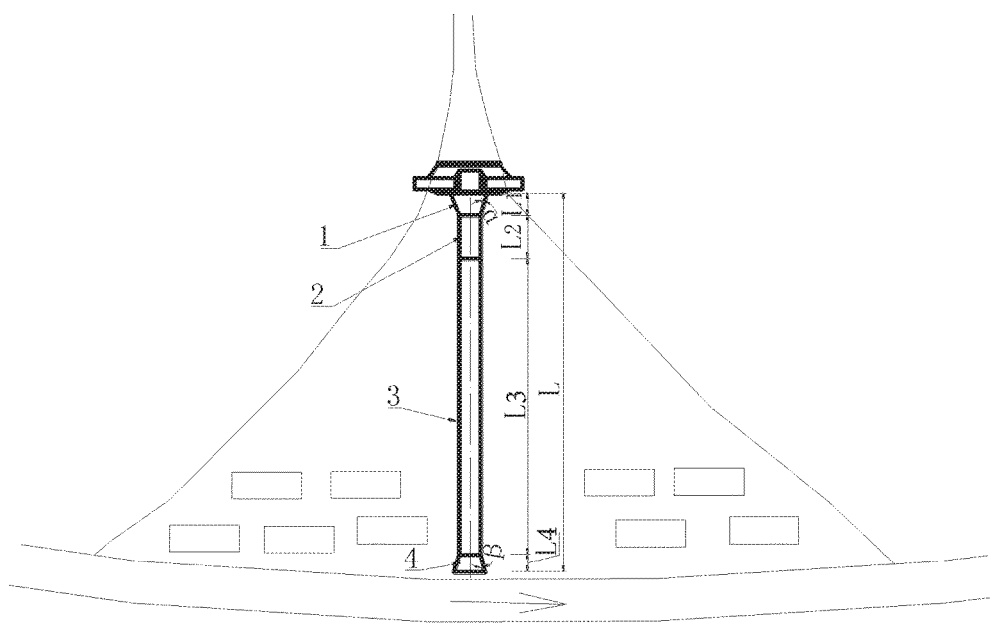
FIG. 1 is a plane layout schematic diagram of a debris flow drainage channel constructed according to the method for planning and designing debris flow drainage channels described by the invention.

As shown in FIG. 1, the debris flow gully contains a viscous debris flow, the drainage area is 5.4 km², and the length of the accumulation fan is 260 m. To control debris flow disasters, a prevention and control scheme based on constructing a check dam group in the drainage basin and constructing a drainage channel on the accumulation fan is planned. The drainage channel is divided into a big-end-up bell-mouthed inlet section 1, an acceleration section 2, a main channel section 3 in which the debris flow flows in a balanced mode, and a big-end-down bell-mouthed outlet section 4 along the flow direction of the debris flow; the drainage channel is constructed of concrete materials. Therefore, the limited flow velocity of the drainage channel is determined to be 8.0 m/s. A method for planning and designing the above drainage channel comprises the following steps.

(1) According to the topographic condition of the debris flow accumulation fan, plan the drainage channel at the mid position of the deposited fan and arrange a check dam to regulate debris flow movement at the upstream part of inlet section 1 of the drainage channel. The total length L of the to-be-constructed drainage channel is 250 m according to the length of the deposited fan; the longitudinal slope of the gully bed of the drainage channel is 0.15 according to the principle that cut and fill are basically balanced; and the width of the bottom of the drainage channel is 4.0 m if the designed drain flow of the drainage channel is 400 m³/s;

(2) The channel type of inlet section 1 is determined to be a fully lined channel type. Under the condition that the debris flow is a viscous debris flow according to drainage design standards and that the longitudinal slope of the gully bed of the drainage channel determined in step 1 is 0.15, the length $L_1$ of the inlet section is 5.0 times as large as the width of the bottom of the drainage channel, i.e., $L_1=5.0\times4.0=20.0$ m, and the included angle α between the side wall of the inlet section 1 and the main channel is 10 degrees;

(3) The channel type of outlet section 4 is determined to be a fully lined channel type. Under the condition that the debris flow is a viscous debris flow according to drainage design standards and that the longitudinal slope of the gully bed of the drainage channel determined in step 1 is 0.15, the length $L_4$ of the outlet section is 3.0 times as large as the width of the bottom of the drainage channel, i.e., $L_4=3.0\times4.0=12.0$ m, and the included angle β between the side wall of the outlet section 4 and the main channel is 5 degrees;

(4) The channel type of acceleration section 2 is determined to be a fully lined channel type. According to field investigation, the flow velocity $v_1$ of the debris flow at the upstream cross-section of the acceleration section 2 is 2.3 m/s, and the sludge-level depth $h_1$ of the debris flow at the upstream cross-section of the acceleration section 2 is 4.35 m, i.e., $h_1$=designed drain flow/(width of bottom of drainage channel×$v_1$)=40.0/(4.0×2.3)=4.35 m. The designed flow velocity of the debris flow at the downstream cross-section of acceleration section 2 is 1.0 times as large as the limited flow velocity, i.e., $v_2$=8.0 m/s, and the sludge-level depth $h_2$ of the debris flow at the downstream cross-section of the acceleration section 2 is 1.25 m, i.e., $h_2$=designed drain flow/(width of bottom of drainage channel×$v_2$)=40.0/(4.0×8.0)=1.25 m. Substituting the parameters above into a steady non-uniform channel gradually varied flow calculation model to conduct iterative calculation results in a length $L_2$ of the acceleration section 2 of 10.9 m.

(5) According to the longitudinal slope (0.15) of the gully bed of the drainage channel determined in step 1 and the optimal longitudinal slope intervals of the gully beds applicable to different channel types of drainage channels, the channel type of main channel section 3 is a transversely penetrated notched sill type, and the length $L_3$ of the main channel section 3 is 207.1 m, i.e., $L_3=L-L_1-L_2-L_4=207.1$ m.

Embodiment 2

Figure 2:
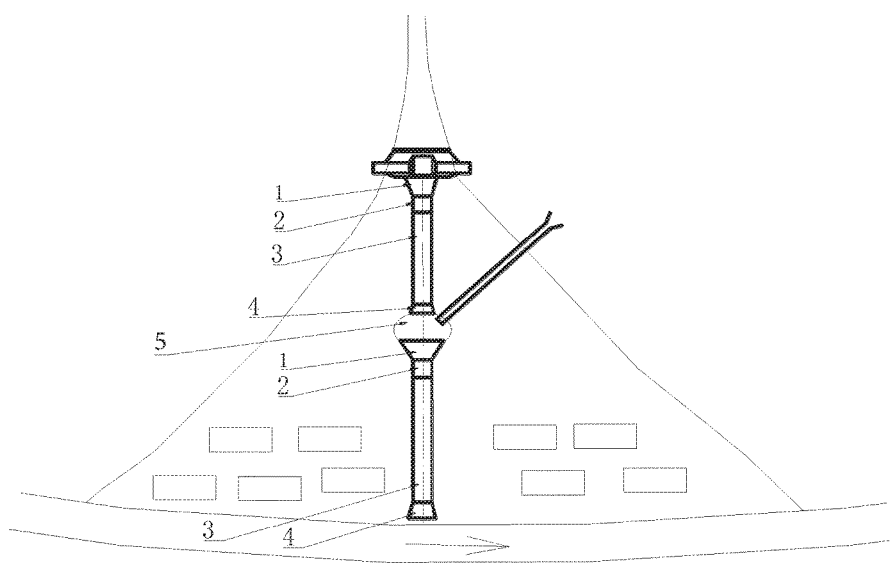
FIG. 2 is a plane layout schematic diagram of a debris flow drainage channel constructed according to the method for planning and designing debris flow drainage channels described by the invention when the length of the debris flow accumulation fan is greater than 300 m and a transition zone accommodates the afflux of a debris flow in a tributary ditch.

As shown in FIG. 1 and FIG. 2, the flow in the debris flow gully is a dilute debris flow, the drainage area is 8.6 km², and the length of the accumulation fan is 500 m. To control debris flow disasters, a prevention and control scheme based on constructing a check dam group in the drainage basin and a drainage channel on the deposited fan is planned. Because the length of the debris flow-deposited fan is greater than 300 m, the proposed drainage channel includes two relatively independent debris flow drainage channels (i.e., an upper drainage channel and a lower drainage channel), which are connected in an end-to-end mode from upstream to downstream. Transition zone 5 is arranged between the upper and lower drainage channels, its along-the-flow direction of the debris flow is 20 m, and it is used to accommodate the afflux of the debris flow in a tributary ditch on the surface of the fan.

The upper drainage channel is divided into a big-end-up bell-mouthed inlet section 1, an acceleration section 2, a main channel section 3 in which the debris flow flows in a balanced mode, and a big-end-down bell-mouthed outlet section 4 along the flow direction of the debris flow. The upper drainage channel is constructed of reinforced concrete; therefore, the limited flow velocity of the drainage channel is determined to be 8.0 m/s. The method for planning and designing the upper drainage channel comprises the following steps.

(1) According to the topographic condition of the debris flow accumulation fan, the upper drainage channel is planned at the upper position of the accumulation fan, and a check dam is arranged to regulate debris flow movement at the upstream part of inlet section 1 of the upper drainage channel. The total length L of the proposed upper drainage channel is 300 m; according to the principle that cut and fill are basically balanced, the longitudinal slope of the gully bed of the upper drainage channel is 0.22; and the width of the bottom of the upper drainage channel is 5.0 m if the designed drain flow of the upper drainage channel is 64.0 m³/s;

(2) The channel type of inlet section 1 is determined to be a fully lined channel type. Under the conditions that the debris flow is a dilute debris flow according to drainage design standards and that the longitudinal slope of the gully bed of the drainage channel determined in step 1 is 0.22, the length $L_1$ of the inlet section is 1.5 times as large as the width of the bottom of the drainage channel, i.e., $L_1$=1.50×5.0=7.5 m, and the included angle α between the side wall of inlet section 1 and the main channel is 30 degrees.

(3) The channel type of outlet section 4 is determined to be a fully lined channel type. Under the condition that the debris flow is a dilute debris flow according to drainage design standards and that the longitudinal slope of the gully bed of the drainage channel determined in step 1 is 0.22, the length $L_4$ of the outlet section is 1.0 times as large as the width of the bottom of the drainage channel, i.e., $L_4$=1.0λ5.0=5.0 m, and the included angle β between the side wall of outlet section 4 and the main channel is 15 degrees.

(4) The channel type of acceleration section 2 is determined to be a fully lined channel type. According to a steady non-uniform channel gradually varied flow calculation model, iterative calculations determine that the length $L_2$ of the acceleration section 2 is 6.1 m.

(5) According to the longitudinal slope (0.22) of the gully bed of the drainage channel determined in step (1) and optimal longitudinal slope intervals of gully beds applicable to different channel types of drainage channels, the channel type of the main channel section 3 is a box lined type, and the length $L_3$ of the main channel section 3 is 281.4 m, i.e., $L_3$=L−$L_1$−$L_2$−$L_4$=300−7 0.5−6.1−5.0=281.4 m.

The lower drainage channel is divided into a big-end-up bell-mouthed inlet section 1, an acceleration section 2, a main channel section 3 in which the debris flow flows in a balanced mode, and a big-end-down bell-mouthed outlet section 4 along the flow direction of the debris flow. The lower drainage channel is constructed of cement-rubble material; therefore, the limited flow velocity of the drainage channel is determined to be 6.0 m/s. The method for planning and designing the lower drainage channel comprises the following steps.

(1) According to the topographic condition of a debris flow-deposited fan, the lower drainage channel is planned for the lower position of the deposited fan. The total length L of the to-be-constructed lower drainage channel is 180 m, and according to the principle that cut and fill are basically balanced, the longitudinal slope of the gully bed of the lower drainage channel is 0.07. Because the afflux of the debris flow in a tributary ditch on the surface of the fan is 13.0 m³/s and the designed drain flow of the lower drainage channel is 77.0 m³/s, the width of the bottom of the lower drainage channel is 6.0 m.

(2) The channel type of inlet section 1 is determined to be a fully lined channel type. Under the condition that the debris flow is a dilute debris flow according to drainage design standards and that the longitudinal slope of the gully bed of the drainage channel determined in step 1 is 0.07, the length $L_1$ of inlet section 1 is 2.0 times as large as the width of the bottom of the drainage channel, i.e., $L_1$=2.0×6.0=12.0 m, and the included angle α between the side wall of inlet section 1 and the main channel is 30 degrees.

(3) The channel type of outlet section 4 is determined to be a fully lined channel type. Under the condition that the debris flow is a dilute debris flow according to drainage design standards and that the longitudinal slope of the gully bed of the drainage channel determined in step 1 is 0.07, the length $L_4$ of the outlet section is 1.5 times as large as the width of the bottom of the drainage channel, i.e., $L_4$=1.5× 6.0=9.0 m, and the included angle β between the side wall of outlet section 4 and the main channel is 15 degrees.

(4) The channel type of acceleration section 2 is determined to be a fully lined channel type. According to a steady non-uniform channel gradually varied flow calculation model, iterative calculations determine that the length $L_2$ of the acceleration section 2 is 4.3 m.

(5) According to the longitudinal slope (0.07) of the gully bed of the drainage channel determined in step 1 and the optimal longitudinal slope intervals of gully beds applicable to different channel types of drainage channels, the channel type of the main channel section 3 is a symmetrical notched sill type, and the length $L_3$ of main channel section 3 is 154.7 m, i.e., $L_3$=L−$L_1$−$L_2$−$L_4$=180−12.0−4.3−9.0=154.7 m.

Embodiment 3

Figure 3:
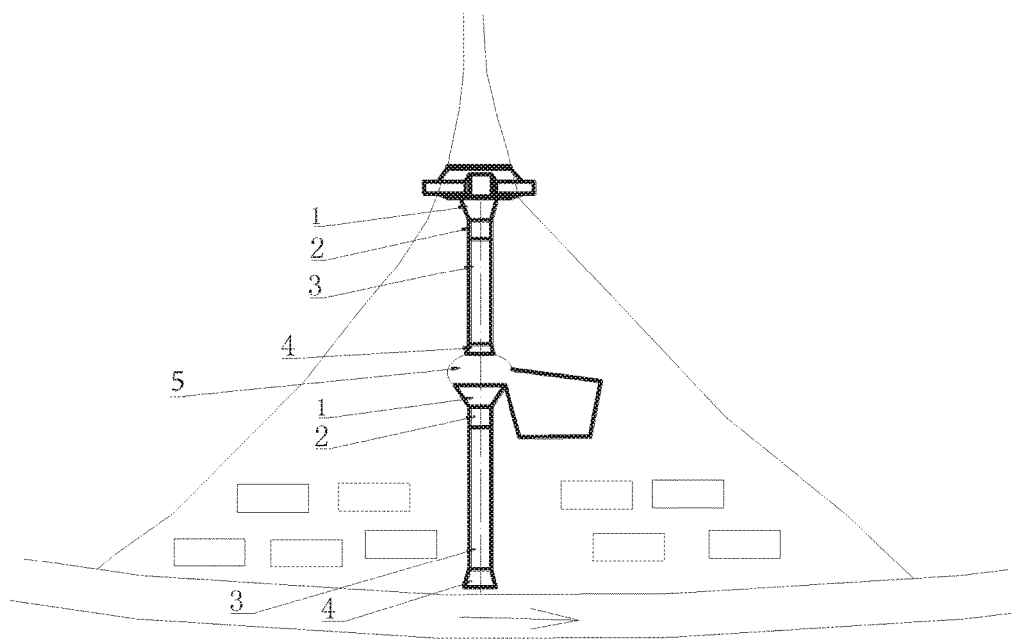
FIG. 3 is a plane layout schematic diagram of a debris flow drainage channel constructed according to the method for planning and designing debris flow drainage channels described by the invention when the length of the debris flow accumulation fan is greater than 300 m and a transition zone directs part of the debris flow outward to prevent depositing.

As shown in FIG. 1 and FIG. 3, the details identical to embodiment 2 are not repeated. Embodiments 3 and 2 differ as follows: transition zone 5 is used to lead out part of a debris flow to stop depositing, and a filed for stopping depositing is provided at the left side of the transition zone that faces the lower drainage channel.

We claims:

1. A method for constructing a debris flow drainage channel, wherein the debris flow drainage channel is divided into an inlet section, an acceleration section, a main channel section in which a debris flow flows in a balanced mode, and an outlet section along the flow direction of the debris flow, the method comprising:

planning a position of the debris flow drainage channel and determining a total length (L) of the debris flow drainage channel based on a topographic condition of a debris flow accumulation fan, and determining a longitudinal slope of a gully bed of the debris flow drainage channel based on a principle in which cutting and filling are substantially balanced;

forming the inlet section as a fully lined channel type, wherein the length ($L_1$) of the inlet section and an included angle between a side wall of the inlet section and the main channel section are determined based on properties of the drained debris flow and the determined longitudinal slope of the gully bed of the debris flow drainage channel;

forming the outlet section as a fully lined channel type, wherein the length ($L_4$) of the outlet section and an included angle between a side wall of the outlet section and the main channel section are determined based on the properties of the drained debris flow and the determined longitudinal slope of the gully bed of the debris flow drainage channel;

forming the acceleration section as a fully lined channel type, wherein the length ($L_2$) of the acceleration section is determined based on a steady non-uniform channel gradually varied flow calculation model, wherein the length $L_2$ is calculated based on the equation: $L_2 = (E_x - E_s)/(i - J)$, wherein $E_x$ refers to ever y of a downstream cross-section of the acceleration section;

wherein $E_s$ refers to energy of an upstream cross-section of the acceleration section;

wherein i refers to the determined longitudinal slope of the gully bed of the debris flow drainage channel; and wherein J refers to an average hydraulic gradient of a top surface of the debris flow at the acceleration section;

determining a channel type of the main channel section based on the determined longitudinal slope of the gully bed of the debris flow drainage channel and longitudinal slope intervals of gully beds applicable to different channel types of debris flow drainage channels, and determining the length ($L_3 = L - L_1 - L_2 - L_4$) of the main channel section; and constructing the debris flow drainage channel based on the determined channel type of the main channel section and the determined length of the main channel section.

2. The method of claim 1, wherein a limited flow velocity of the debris flow drainage channel is determined based on material and structure of the debris flow drainage channel and wherein a designed flow velocity of the downstream cross-section of the acceleration section and a designed flow velocity of the main channel section are 0.8-1.0 times of the limited flow velocity.

3. The method of claim 1, wherein the channel type of the main channel section comprises at least one of a fully lined type, a symmetrical notched sill type, a staggered notched sill type, a transversely penetrated notched sill type and a box lined type.

4. The method of claim 3, wherein the longitudinal slope intervals of gully beds applicable to different channel types of debris flow drainage channels are as follows: 0.01-0.03 for a fully lined type, 0.03-0.08 for a symmetrical notched sill type, 0.08-0.12 for a staggered notched sill type, 0.12-0.20 for a transversely penetrated notched sill type and 0.20-0.40 for a box lined type.

5. The method of claim 1, wherein the length ($L_1$) of the inlet section is 1.5-5.0 times of the width of the bottom of the debris flow drainage channel, and the included angle between the side wall of the inlet section and the main channel section is 10-30 degrees.

6. The method of claim 1, wherein the length ($L_4$) of the outlet section is 1.0-3.0 times of the width of the bottom of the debris flow drainage channel, and the included angle between the side wall of the outlet section and the main channel section is 5-15 degrees.

7. The method of claim 1, wherein the total length (L) of the debris flow drainage channel is less than or equal to 300 m.

8. A method of applying the method of claim 1, wherein the method of claim 1 is used for constructing a debris flow drainage channel with a total length of less than or equal to 300 m and the upstream part of the inlet section of the debris flow drainage channel is provided with a check dam used with the constructed drainage channel.

9. A method of applying the method of claim 1 when a length of a debris flow accumulation fan is greater than 300 m, wherein:

the method of claim 1 is used to construct at least two debris flow drainage channels that are independent and connected in tandem; and the upstream part of the inlet section of the upstream-most drainage channel is provided with a check dam used with the drainage channel.

10. The method of claim 9, wherein a transition zone is arranged between two adjacent upstream and downstream drainage channels, for accommodating the afflux of a debris flow in a tributary ditch on the surface of the debris flow accumulation fan or leading out part of the debris flow to prevent depositing.

* * * * *